G. W. HAYDEN.
METHOD OF APPLYING ACTIVE MATERIAL TO SECONDARY BATTERY PLATES.
APPLICATION FILED JULY 1, 1914.
1,197,737.  Patented Sept. 12, 1916.
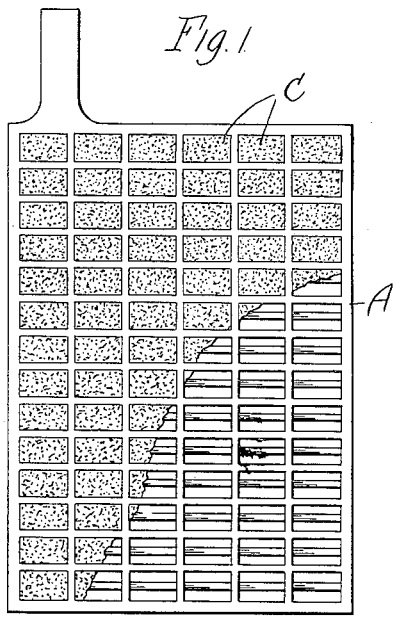
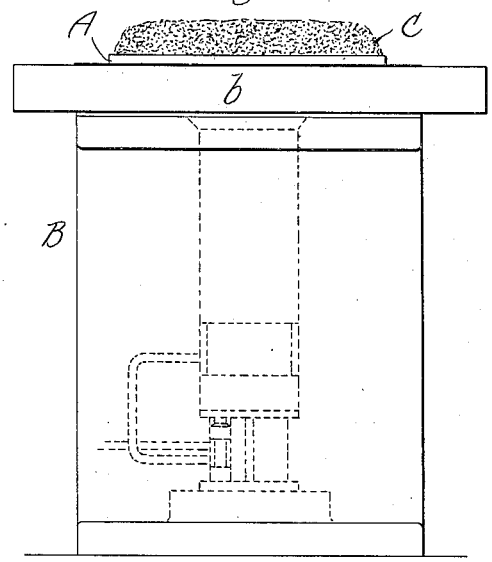
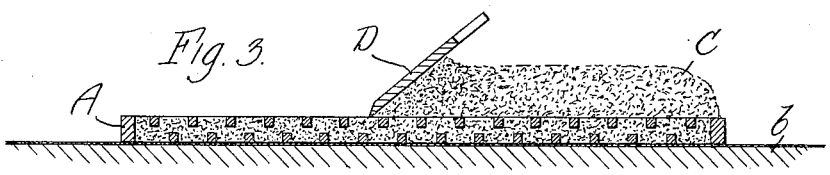
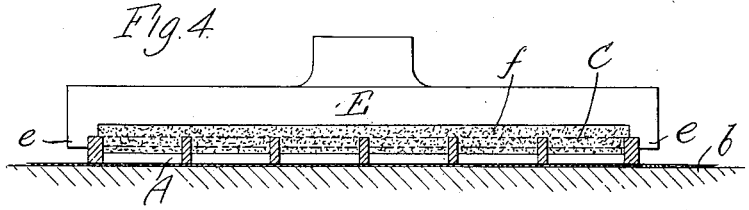
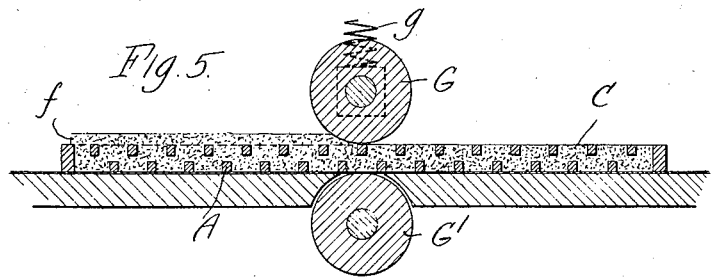

UNITED STATES PATENT OFFICE.

GEORGE WALWORTH HAYDEN, OF BUFFALO, NEW YORK, ASSIGNOR TO GOULD COUPLER COMPANY, OF NEW YORK, N. Y.

METHOD OF APPLYING ACTIVE MATERIAL TO SECONDARY-BATTERY PLATES.

1,197,737. Specification of Letters Patent. Patented Sept. 12, 1916.

Application filed July 1, 1914. Serial No. 848,371.

*To all whom it may concern:*

Be it known that I, GEORGE W. HAYDEN, a citizen of the United States, residing at Buffalo, in the county of Erie and State of New York, have invented a new and useful Improvement in Methods of Applying Active Material to Secondary-Battery Plates, of which the following is a specification.

This invention relates to a method of applying the active material to the grids or plates of secondary battery electrodes of that kind, for example, in which the grid is provided with cavities or spaces of one kind or another in which the active material is confined. The active material which is in the nature of a paste when it is applied to the plate or grid, is ordinarily spread over the plate and worked into the retaining spaces or cavities thereof by means of hand tools. This is a laborious operation and increases the cost of the electrodes. Attempts have been made to apply the material to the plates more expeditiously and economically by rolling and in other ways, but these methods have, in most instances, not been commercially successful.

The object of this invention is to apply the paste to battery plates or grids by a thoroughly practical method which is expeditious and economical and which furthermore enables the density or hardness of the paste on the plate to be readily regulated as may be required. According to this method the battery plate with a batch of the active paste thereon is placed on a jarring or jolting machine and jarred, thereby causing the paste to spread and pack into the confining spaces of the plate. After thus jarring the plate the upper surface of the paste is leveled off, or the superfluous paste removed from the upper surface of the grid or plate, for instance by scraping it off with a suitable blade or tool. If desired, the plate can be scraped so as to leave the paste in the confining spaces of the plate substantially flush with the upper surface of the retaining bars or portions of the plate. The density or hardness of the parts in the plate or grid is dependent upon the extent to which the plate or grid is jarred, and can be readily regulated as desired by jarring the plate a greater or less number of times.

Different active materials vary more or less in consistency, for instance the paste sometimes used in positive electrodes is stiffer than that used in negative electrodes. In applying such pastes it is usually advantageous to further compress the paste by rolling action after jarring the paste into the grids or plates as above explained. When thus preparing the electrodes the paste is not scraped off of the plate or grid flush with the surface thereof but is scraped so that a layer of paste is left projecting somewhat above the surface of the plate or grid. This relatively thin layer of paste is compressed into the confining spaces of the plate or grid when the latter is passed between the compressing rolls.

In the accompanying drawings: Figure 1 is an elevation of a battery electrode filled with paste according to this method, a portion of the paste being removed to disclose the plate or grid. Fig. 2 is a view illustrating the manner of jarring the paste into the grid. Fig. 3 is a view showing how the superfluous paste is scraped off of the plate or grid. Fig. 4 is a view illustrating how the paste is scraped off of a plate or grid which is to be afterward rolled. Fig. 5 is a view illustrating the rolling step of the operation.

As indicated in Fig. 2, the battery plate or grid A is laid on the vertically reciprocating platen $b$ of a jarring or jolting machine B, which may be of any known or suitable type, and a batch of the active material or paste C is placed on the plate or grid. When the jarring machine is set in operation the paste is caused to pack into the confining spaces of the plate or grid by the reciprocations of the platen $b$, the jarring action being controlled as required to give the desired compactness or hardness of the paste in the plate or grid. The paste is then leveled or scraped off of the plate or grid by means of a suitable blade or tool D, as indicated in Fig. 3.

Fig. 4 shows a scraper E suitable for use when the electrode is to be rolled after jarring in the paste. This scraper has depending end portions $e$ which hold the scraping edge up off of the surface of the plate or grid so as to leave a projecting layer $f$ of the paste on the plate or grid. Any other suitable means could be used in place of the scraper E. This projecting layer of paste is then compressed into the plate or grid, as for instance by passing the plate or grid between compressing rolls G G', as shown in Fig. 5. The upper roll is preferably yieldingly mounted, and springs $g$ or other means can be employed for regulating the pressure of the roll as required. By thus rolling the electrode after first jarring in the paste as explained, and leaving a comparatively thin even layer of paste projecting from the plate or grid, the paste is uniformly compressed to the required condition in the plate or grid, whereas it has been found impossible to obtain similar practical results by attempting to roll the paste into the grid without the preliminary jarring operation.

I claim as my invention:

The herein described method of applying active material to secondary battery plates, consisting in placing a quantity of the active material loosely on the battery plate, jarring the plate to fill the cavities thereof with said material, leveling off the material to leave a substantially uniform layer of material projecting above the plate, and then subjecting the material to a rolling action to compress it into the cavities of the plate.

Witness my hand, this 26th day of June, 1914.

GEORGE WALWORTH HAYDEN.

Witnesses:
R. D. WILLIAMS,
G. L. TALLEY.